United States Patent [19]

Cotter

[11] Patent Number: 5,125,290

[45] Date of Patent: Jun. 30, 1992

[54] RACK AND PINION LIFTER

[75] Inventor: Patrick J. Cotter, Plymouth, Mich.

[73] Assignee: Power Components, Inc., Redford, Mich.

[21] Appl. No.: 483,069

[22] Filed: Feb. 21, 1990

Related U.S. Application Data

[63] Continuation-in-part of Ser. No. 372,427, Jun. 23, 1989, abandoned.

[51] Int. Cl.⁵ ............................ F16H 37/06; B66F 3/02
[52] U.S. Cl. ............................ 74/665 GA; 74/468; 74/30; 74/422; 74/110; 254/95; 184/99
[58] Field of Search ............ 184/6.12, 99; 74/467, 74/468, 665 GA, 422, 89.17, 110, 30, 498; 254/95, 89 R

[56] References Cited

U.S. PATENT DOCUMENTS

| | | | |
|---|---|---|---|
| 408,833 | 8/1889 | Faul | 184/99 |
| 2,704,465 | 3/1955 | Haller | 74/467 X |
| 3,213,657 | 10/1965 | Robb | 254/89 R |
| 3,220,267 | 11/1965 | Smith | 74/110 |
| 3,396,595 | 8/1968 | Niemann | 74/468 X |
| 3,400,593 | 9/1968 | Darnell | 74/29 |
| 3,404,582 | 10/1968 | Södergard et al. | 74/467 X |
| 3,541,875 | 11/1970 | Demorest | 74/468 |
| 3,670,583 | 6/1972 | Leming | 74/89.15 |
| 3,673,874 | 7/1972 | Zaruba et al. | 74/25 |
| 3,945,260 | 3/1976 | Horvath et al. | 74/89.17 |
| 4,381,824 | 5/1983 | Pastusek | 184/99 X |
| 4,466,387 | 8/1984 | Perry | 74/579 E |
| 4,584,893 | 4/1986 | Harding et al. | 74/467 X |

FOREIGN PATENT DOCUMENTS 1400082 7/1975 United Kingdom ............... 74/498

Primary Examiner—Richard Lorence
Assistant Examiner—Benjamin Levi
Attorney, Agent, or Firm—Barnes, Kisselle, Raisch, Choate, Whittemore & Hulbert

[57] ABSTRACT

A device with one or more actuator racks carried by a housing for reciprocation and each meshing with a separate pinion gear having a non-circular central hole in which a complimentary coupling shaft can be removably received for rotation in unison with the gear(s). The pinion gears are carried and journalled for rotation in the housing by a pair of co-axial bushings with generally opposed and spaced apart axially projecting rims received in mating peripheral shoulders in the side faces of the gears. The gear teeth extend generally axially continuously between their side faces with the shoulders in their side edges. Preferably the radial extent of each shoulder is less than the radial extent of the teeth. When the coupling shaft is removed from the gears each pinion can rotate independently of the shaft and each other to initially position its associated rack at a desired location and when the shaft is inserted in the pinion gears they rotate in unison to simultaneously actuate the rack(s).

22 Claims, 3 Drawing Sheets

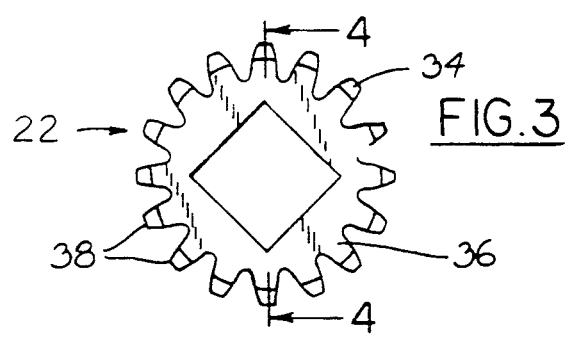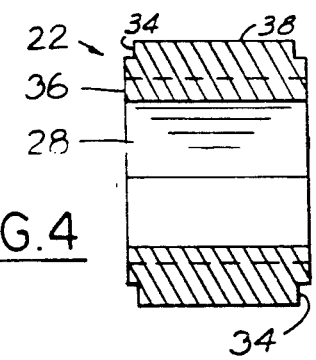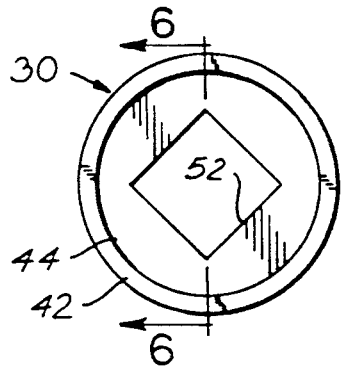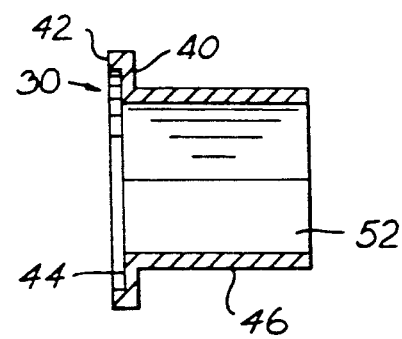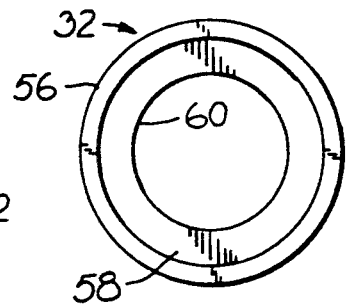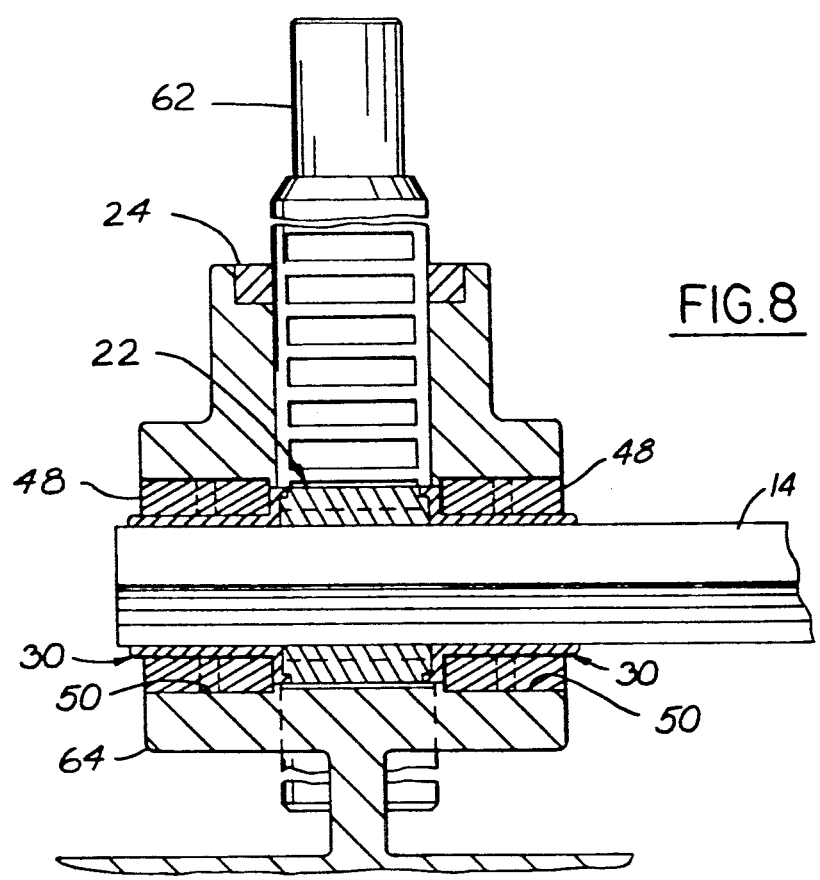

RACK AND PINION LIFTER

REFERENCE TO CO-PENDING APPLICATION

This is a continuation-in-part of U.S. patent application Ser. No. 07/372,427, now abandoned, filed Jun. 23, 1989.

FIELD

This invention relates to actuators or lifters, and more particularly, to rack and pinion actuator devices.

BACKGROUND

Various actuator and lifter devices with rack and pinion gearing have been previously used for many different applications, including conveying and transferring workpieces, lifting formed sheet metal parts from stamping dies, and the like. In many applications, it is necessary that the actuator device be compact and small relative to its load bearing capabilities.

One such compact lifting device with an actuator rack driven by a pinion gear is shown in U.S. Pat. No. 3,400,593. A plurality of these devices may be linked together to drive their respective racks in unison by a non-circular connecting shaft removably engagable with the pinion gear for rotation in unison therewith. This arrangement also enables the racks to be positioned at a desired location with respect to a common reference plane before the devices are operably linked together by the non-circular connecting shaft. If desired, a single device can have a plurality of racks each with an associated separate pinion with all of the pinions of the device being operably coupled together by a non-circular shaft so that the racks will be driven in unison.

With this compact lifting device, problems have been experienced with the durability, strength and load bearing capacity or capability of the bearings and pinion gears, and particularly with pinion gears having a pitch diameter of less than about two inches. In use, these pinion gears are susceptible to permanent deformation, distortion, cracking, and fracturing, have a relatively short useful life and require considerable service, maintenance and replacement. Moreover, when they fail they frequently damage other components of the device which also then require replacement or scrapping of the entire device.

Moreover, problems have been experienced with the lubrication, durability and wearability of the bearings for the rack which frequently resulted in bearing failure after only a few thousand cycles of the lifting device.

SUMMARY OF THE INVENTION

In an actuator device of this invention, to enhance its strength, load bearing capability and durability, each pinion gear has an annual peripheral shoulder in each of its side faces which receives a rim of an annular ring, bushing or other supporting element for journalling each pinion gear for rotation on its axis in mesh with an actuator rack slidably received in a housing to advance and retract the rack. Preferably, the teeth of the pinion gear extend continuously generally axially between its side faces, the shoulders are in the peripheral edges of the teeth, and the radial extent of each shoulder is less than the radial extent of its associated teeth.

Each pinion gear is driven by a non-circular and preferably square shaft slidably and removably received in a complementary non-circular central hole through the pinion gear. Preferably, the bushings supporting the gear also have a complimentary non-circular central hole through which the shaft is slidably and removably received.

Preferably, each rack and pinion gear is permanently lubricated preferably with a graphite lubricant and the racks are journalled in hard bronze bearings to greatly increase the useful life of the lifting device. These bearings and permanent lubrication dramatically increase the in service useful life of the lifting device to for the applicable load, cycle rate and installation.

OBJECTS, FEATURES AND ADVANTAGES

Objects, features and advantages of this invention are to provide an actuator device with a relatively high working load capacity and which is compact, extremely durable, rugged, of simplified design, manufacture and assembly, and in use requires relatively little service and maintenance and has a long useful life.

BRIEF DESCRIPTION OF THE DRAWINGS

These and other objects, features and advantages of this invention will be apparent from the following detailed description, appended claims and accompanying drawings in which:

FIG. 3 is a side view of a pinion gear of the device;

FIG. 4 is a sectional view of the pinion gear taken on line 4—4 of FIG. 3.

FIG. 5 is a side view of a hub of the device;

FIG. 6 is a sectional view of the hub taken on line 6—6 of FIG. 5;

FIG. 7 is a side view of a spacer ring of the device; and

FIG. 8 is a sectional view of the device with one actuator rack of FIG. 1.

DETAILED DESCRIPTION

Figure 1:
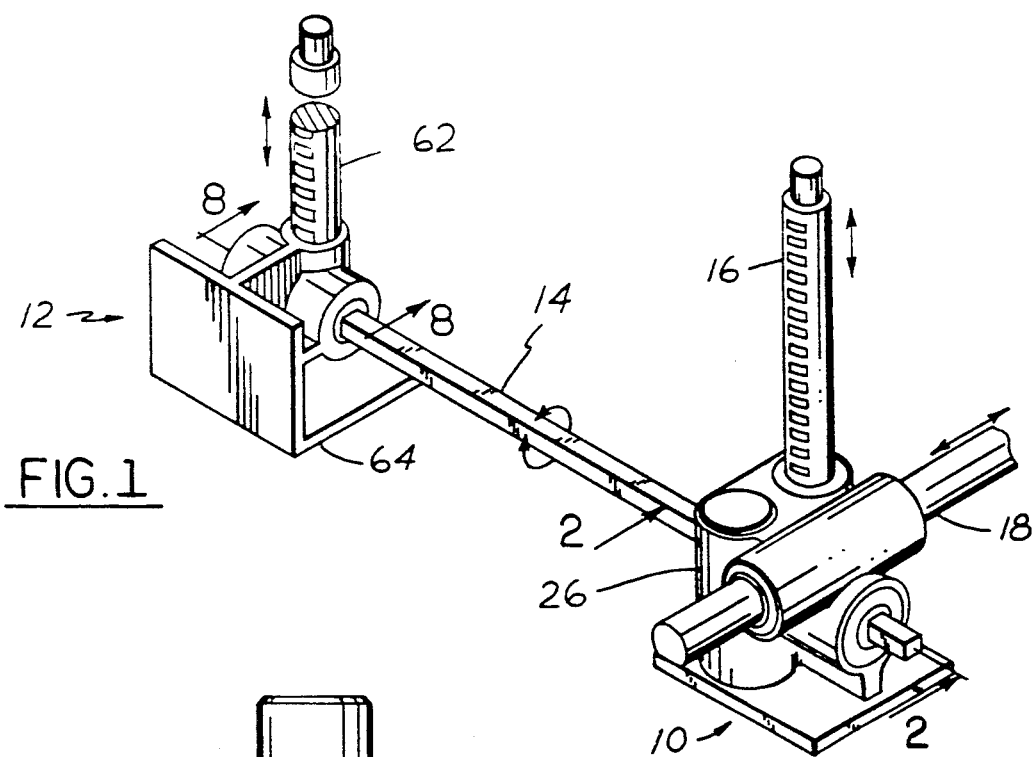
FIG. 1 is a perspective view of a pair of devices embodying this invention operably coupled together by a square shaft.
Figure 2:
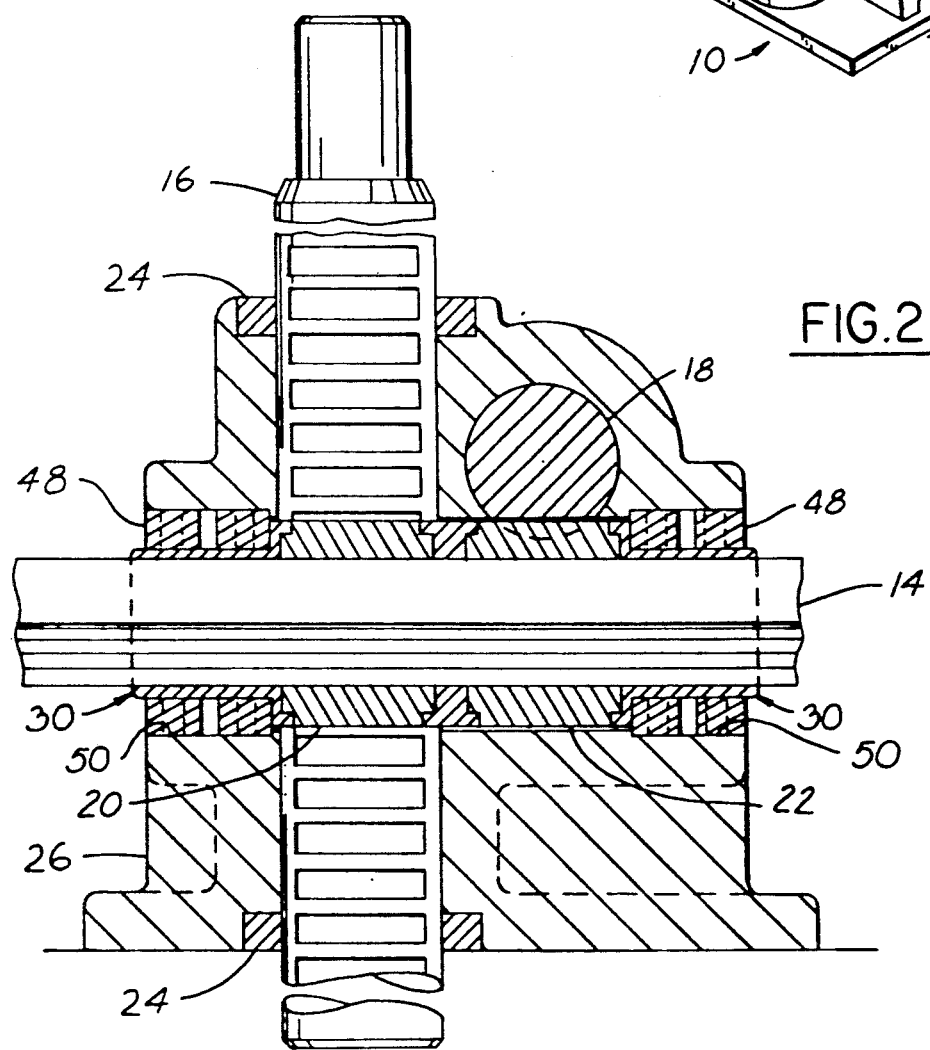
FIG. 2 is a sectional view of the device with two actuator racks of FIG. 1.
Figure 9:
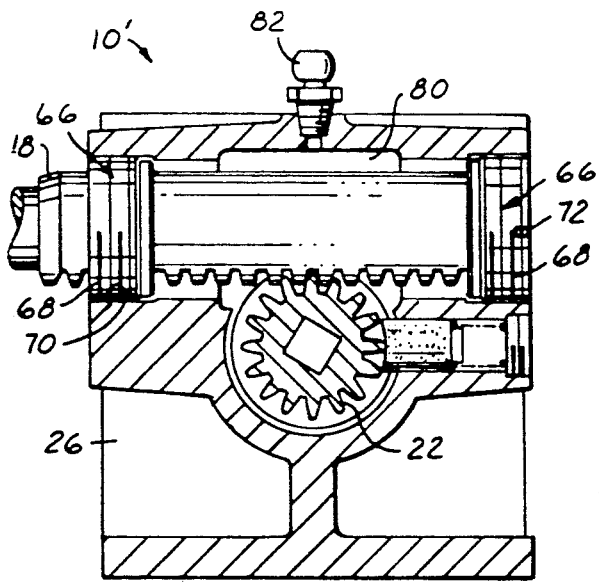
FIG. 9 is a sectional view of a modified two-rack device embodying this invention which illustrates the bearings for one rack and permanent lubrication of this rack and its associated pinion gear.
Figure 10:
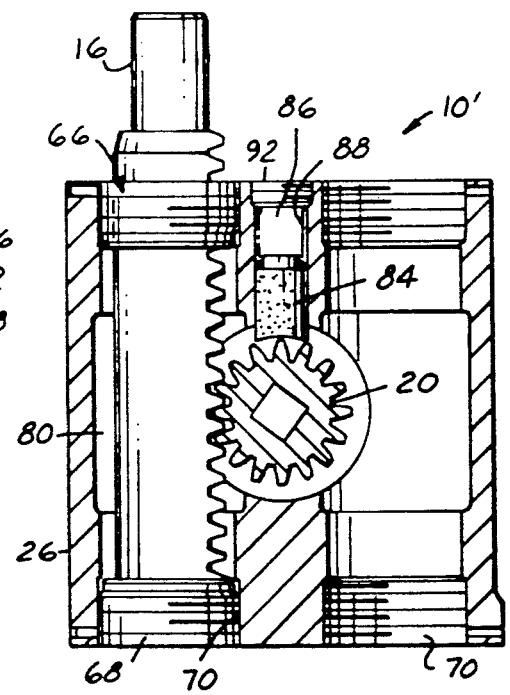
FIG. 10 is another sectional view of the modified embodiment of FIG. 9 which illustrates the bearings for its other rack and permanent lubrication of the other rack and its associated pinion gear.
Figure 11:
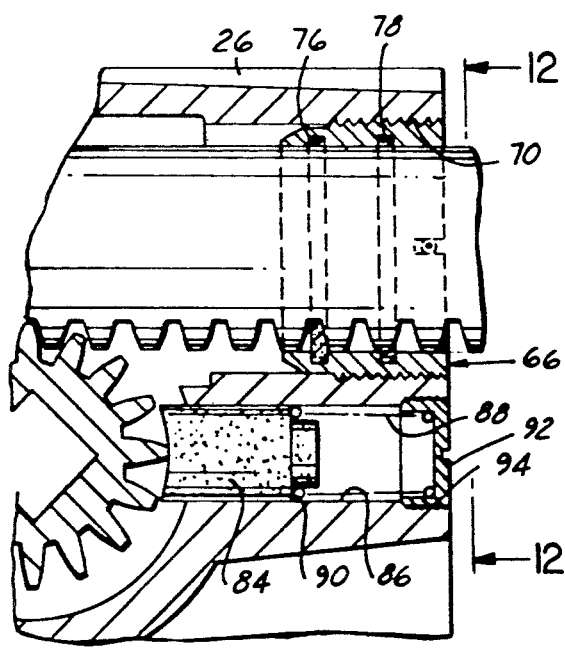
FIG. 11 is an enlarged fragmentary view of a portion of FIG. 9.
Figure 12:
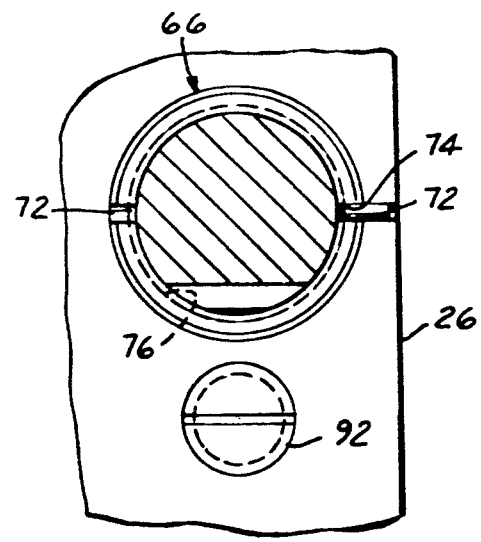
FIG. 12 is a fragmentary view taken generally on line 12—12 of FIG. 11.

Referring in more detail to the drawings, FIG. 1 illustrates two actuator devices 10 and 12 embodying this invention and releasably coupled for operation in unison by a square shaft 14. As shown in FIGS. 1 & 2, the device 10 has a pair of actuator racks 16 and 18 which in assembly mesh with complimentary pinion gears 20 and 22 which preferably are identical. Preferably, the racks extend vertically and horizontally at a right angle to each other. Each rack is slidably received and journalled by a pair of bearings 24 in a housing 26 for reciprocation along its axis.

To permit the initial positions of the racks to be varied and adjusted with respect to each other, and with respect to similar racks in other similar actuator devices, the pinion gears and the shaft 14 are constructed and arranged so the gears can be rotated independently of each other when the shaft is disengaged from the gears. When it is desired to operate the racks together, the pinion gears can be coupled to rotate in unison by the shaft. This is accomplished by providing non-circular and preferably square axial holes 28 (FIGS. 3 & 4) through the gears which when aligned can slidably receive the complimentary non-circular and preferably square shaft 14.

In accordance with this invention, to provide a device of increased strength and durability, the pinion gears are journalled for rotation by a pair of bushings 30 and a spacer ring 32 which overlap and engage peripheral portions of both edges of each gear. As shown in FIGS. 2-4, each pinion gear in each side face has an annular peripheral recess or shoulder 34 and a central pilot or hub 36 projecting axially and extending radially between the shoulder and the central square through holes. Preferably, the gear teeth 38 extend between the side faces and the shoulders are formed in the edges of the teeth. Preferably, the radial height or extent of each shoulder 34 is less than the radial height or depth of the teeth 38 of the gear.

As shown in FIGS. 2, 5 and 6, each bushing 30 has a flange 40 with an axially projecting and preferably circumferentially continuous rib or rim 42 and a central counterbore 44 which are complimentary to and in assembly engage with the shoulder and hub on one side face of each gear. Each bushing also has a central cylindrical portion 46 which in assembly is journalled for rotation in a sleeve bearing 48 which is press fit or otherwise retained in a bore 50 in the housing. To receive the shaft 14, each bushing 30 also has a through hole 52 which is preferably non-circular, preferably square, and complimentary to the shaft.

As shown in FIGS. 2 and 7, in assembly, the adjacent side faces of the gears engage the spacer ring 32. On each side this ring has an annular and axially projecting rib or rim 56 and a central counterbore 58 which in assembly mate with a shoulder and hub of each gear. To provide clearance for the shaft 14, the ring has a through clearance hole 60.

This specific construction and arrangement of the gears, bushings and spacer ring insures each tooth of the gear throughout its entire axial extent is fully supported by the underlying central body portion of the gear. Moreover, since the central body portion extends axially beyond the portion of the teeth engaging the rack it distributes the bending and other stresses to which the teeth are subjected over a larger area and a greater mass of material. Furthermore, with this construction the gears are journalled and supported for rotation by the bushings so that the forces resulting from the working loads to which they are subjected are transmitted to the hubs and central body portion of the gears, not to the teeth or outer peripheral portion of the gears. This construction also maximizes the amount of material in the central body of the gear for a given size through hole complimentary with the shaft 14. Thus, this construction and arrangement greatly increases the strength, maximum working load, durability and reliability of the gear and bushing assembly and hence the entire device. Indeed, the load capacity of this construction is 45% greater than a prior art construction of comparable size based on the British Standard Rating Formulae for gears.

FIG. 8 illustrates the construction of the device 12 which has only one actuator rack 62 which in assembly meshes with a complementary pinion gear 22 for reciprocation of the rack relative to the housing 64. The setup and operation of device 12 is essentially the same as that of device 10 and hence will not be separately described in detail.

FIGS. 9-12 illustrate a modified two-actuator device 10' which has the same construction and operation as device 10 except for a presently preferred construction of the rack bearings and permanent lubrication of the bearings, the rack and pinion. Each actuator rack 16 and 18 is journalled by a pair of permanently lubricated bearings 66 preferably made of a hard bronze material, such as AMCO 18. Each bearing 66 is in the form of a sleeve or bushing with an external threaded portion 68 receivable in a complementarily threaded counterbore 70 in the housing 26. The bushing is releasably retain in the housing by the threaded portions 68 & 70. Each bearing 66 is releasably restrained from rotating in the counterbore by a removable roll pin 72 frictionally received in a hole in the housing and projecting into a slot 74 in the outer end face of the bearing. To provide permanent lubrication of the bearings and rack, graphite 76 is disposed in one or more recesses or grooves 78 in the inner face of the bearing. Each groove 78 opens onto the rack and is preferably circumferentially continouous. Preferably, the graphite 76 is packed and cured in the bearing grooves to provide a permanent continuous ring of solid graphite lubricant. The bearings, racks and pinions can also be lubricated by injecting grease or other lub..cant into the enclosed housing cavity 80 in which they are received through an alimite fitting 82 or the like. Since in use, the actuator devices are usually disposed within dies and the like, in practice they are seldom, if ever, lubricated after being initially installed and during normal use. Therefore, it is important to provide the best permanent lubrication possible.

Additional permanent lubrication for the teeth of each pinion is provided by a body or plug 84 of graphite which is slidably received in a bore 86 in the housing and yieldably biased into engagement with the teeth by a compression spring 88. One end of the spring is received on a shoulder 90 of the graphite plug and the other end is received in a threaded retainer cap 92 removably received in a complementarily threaded housing bore 94. Preferably, the graphite plug has a hardness as determined by a Scleroscope in the range of about 30 to 40 and preferably 35. In use, as the pinion gear 20 rotates graphite from the plug is transferred to the pinion teeth to provide lubrication for the teeth of both the pinion and its associated rack. To further enhance the useful service life of this device, preferably the teeth of each rack are case hardened, such as by nitriding, to increase their resistance to wear.

In setting up the devices 10, 10' and 12, the shaft 14 can be shifted axially to disconnect it from the pinion gears so that they can independently rotate or free wheel to permit each rack to be moved to its desired position for a given installation. After the racks are in a desired position, the pinion gears can be coupled together to rotate in unison for simultaneously actuating and operating the racks by inserting the shaft axially so that it extends through the central square opening 28 in all of the gears. Thereafter, rotation of the shaft 14 in either direction will simultaneously traverse all of the racks. If desired, in some applications, one of the racks, such as the horizontal rack 18 can be driven in either direction to rotate all the pinion gears and the shaft in unison and thereby simultaneously traverse all the remaining racks 16 & 62 in unison.

In the device 10', as each pinion gear 20 and 22 rotates, its teeth are lubricated by graphite from the graphite plug 84 yieldably bearing thereon. Similarily, as each rack 16 and 18 moves it and its associated bearings are lubricated from the graphite 76 deposited in the grooves 78 of the bearings. Thus, device 10' will be adequately lubricated in use and have a long in service life even if it is not periodically lubricated by injecting grease into the housing cavity 80.

I claim:

1. An actuator device comprising, a housing, at least one pinion gear having teeth, for each pinion gear an elongate rack carried by said housing for reciprocal movement relative thereto and meshed with said pinion gear, each pinion gear having a body with a non-circular central hole therethrough constructed and arranged to removably receive a shaft having a complimentary non-circular cross section so that when the shaft is received in said hole said gear will be supported by the shaft and the shaft and gear will rotate in unison on the axis of the gear, each pinion gear having an annular peripheral shoulder therein on each axial side opening generally radially and axially outwardly of said gear and a central hub on said body between said shoulders and said central hole, said gear having a surface within said central hole which bears on the shaft when received therein with said surface having an axial length greater than the axial length of the teeth of said gear disposed between said shoulders of said gear, a pair of bushings each having a cylindrical portion with a central passage through which the shaft can extend and a flange with an axially extending rim constructed and arranged to be received in a shoulder formed within said teeth of said gear and a counterbore receiving the hub associated with said shoulders, and said bushings being in generally opposed relation, journalled in the housing and carrying, supporting and mounting the shaft and all said pinion gears for rotation on a common axis at least substantially co-incident with the axis of rotation of said bushings.

2. The device of claim 1 wherein said teeth of said pinion gear extent generally axially substantially continuously between said sides of said pinion gear, each said shoulders are in said teeth of said pinion gear adjacent the edges of said teeth and one side of said pinion gear, and the radial extent of each shoulder is less than the radial extent of the teeth of said gear.

3. The device of claim 2 wherein the counterbore in each flange has a generally radially and circumferentially extending face which in assembly bears on a side face of the hub of said gear.

4. The device of claim 1 wherein the passage through each bushing has a non-circular cross section complimentary with the cross section of the shaft so that when the shaft is received in both bushings the shaft and both bushings will rotate in unison with all of said pinion gears.

5. The device of claim 1 wherein the cylindrical portion of each bushing is received in a bearing carried by said housing to journal for rotation all of said pinion gears and bushings.

6. The device of claim 1 which comprises at least two pinion gears each engaged with one of said bushings and constructed and arranged to each rotate independently of the other when no shaft is received in their central holes and to rotate in unison when the shaft is received in the central holes of all the pinion gears.

7. The device of claim 1 which has only two pinion gears and also comprises a spacer ring disposed between said gears and having a pair of axially projecting rims each received on one of the shoulders of one of said two pinion gears.

8. The device of claim 1 which has only one pinion gear and each bushing engages one shoulder of said one gear.

9. The device of claim 1 which also comprises at least two bearings carried by said housing and journaling one of said elongate racks for reciprocal movement relative thereto, at least one of said bearings having at least one recess therein opening onto said elongate rack journalled therein, and a graphite lubricant deposited in said recess for providing lubrication.

10. The device of claim 9 wherein said rack is of steel and case hardened.

11. The device of claim 9 wherein said bearings are of hard bronze.

12. The device of claim 9 wherein said bearings are of hard bronze and said rack associated therewith is of steel and case hardened.

13. The device of claim 9 wherein each of said bearings has at least two axially spaced apart and circumferentially continuous recesses therein opening onto its associated rack and each said recess has a graphite lubricant received therein.

14. The device of claim 1 which also comprises at least two bearings carried by said housing and journalling said elongate rack for reciprocal movement relative thereto, at least one of said bearings having at least one recess therein opening onto said rack journalled therein, a graphite lubricant deposited in said recess for providing lubrication, and at least one body of graphite material carried by said housing and yieldably biased into engagement with said pinion gear to bear on the teeth thereof when rotated relative thereto for lubrication thereof.

15. The device of claim 1 which also comprises at least two bearings carried by said housing and journalling said elongate rack for reciprocal movement relative thereto, at least one of said bearings having at least one recess therein opening onto said rack journalled therein, a graphite lubricant deposited in said recess for providing lubrication, at least one body of graphite material carried by said housing and yieldably biased into engagement with said pinion gear to bear on the teeth thereof when rotated relative thereto for lubrication thereof, said housing having a cavity enclosing each said pinion gear and at least the portion of said rack disposed between said bearings, and a lubricant fitting carried by said housing, communicating with said cavity and constructed and arranged to permit a lubricant to be injected into said cavity through said fitting.

16. The device of claim 1 which also comprises a body of graphite material carried by said housing for reciprocal movement generally radially of said pinion gear, means yieldably biasing said body into engagement with the teeth of said pinion gear when rotated relative thereto for lubrication thereof.

17. An actuator device comprising, a housing, at least two pinion gears, for each pinion gear an elongate rack carried by said housing for reciprocal movement relative thereto and meshed with said respective pinion gear, each pinion gear having a body with a non-circular central hole therethrough constructed and arranged to removably receive a shaft having a complimentary non-circular cross section so that when the shaft is received in said hole said gears will be supported by the shaft and the shaft and gears will rotate in unison on the axis of the gears, each pinion gear having an annular peripheral shoulder therein on each axial said opening generally radially and axially outwardly of said gear and a central hub on said body between said shoulders and said central hole, each said gear having a surface within its central hole which bears on the shaft when received therein with said surface having an axial length greater than the axial length of the teeth of said gear disposed between said shoulders of said gear, a pair of bushings each having a cylindrical portion with a central passage through which the shaft can extend and a flange with an axially extending rim constructed and arranged to be received in a shoulder of one of said gears and a counterbore receiving the hub associated with said shoulder of said gear, a spacer ring disposed between a pair of adjacent pinion gears and having a pair of axially projecting rims each received on one of the shoulders of one of the gears of said pair of pinion gears, each bushing engaging a separate one of said gears, and said bushings being in generally opposed relation, journalled in the housing and carrying, supporting and mounting the shaft and all said pinion gears for rotation on a common axis at least substantially co-incident with the axis of rotation of said bushings.

18. An actuator device comprising, a housing, an elongate rack carried by said housing for reciprocal movement relative thereto, a separate pinion gear meshed with said rack and having a body with a non-circular central hole therethrough constructed and arranged to removably receive a shaft having a complimentary non-circular cross section so that when the shaft is received in said hole said gear will be supported by the shaft and the shaft and gear will rotate in unison on the axis of said gear, each side of said pinion gear having an annular peripheral shoulder therein opening generally radially and axially outwardly of said gear and a central hub on said body between said shoulders and said central hole, said gear having a surface within said central hole which bears on the shaft when received therein with said surface having an axial length greater than the axial length of the teeth of said gear disposed between said shoulders of said gear, at least two bearings carried by said housing and journalling said elongate rack for reciprocal movement relative thereto, the exterior of each said bearing having a threaded portion thereon received in a complementarily threaded portion of said housing, at least one of said bearings having at least one recess therein opening onto said elongate rack journalled therein, a graphite lubricant deposited in said recess for providing lubrication, a pair of bushings each having a cylindrical portion with a central passage through which the shaft can extend and a flange with an axially extending rim constructed and arranged to be received in a shoulder of said gear and a counterbore receiving the hub associated with said shoulder of said gear, and said bushings being in generally opposed relation, journalled in the housing and carrying, supporting and mounting the shaft and said pinion gear for rotation on a common axis at least substantially co-incident with the axis of rotation of said bushings.

19. The device of claim 18 wherein each said bearing has at least one recess adjacent one end thereof and also comprises a pin disposed in said recess and carried by said housing to prevent rotation of its associated bearing relative to said housing.

20. Actuator apparatus comprising, a housing, at least two separate pinion gears having teeth, an elongate rack associated and meshed with each said gear and carried by said housing for reciprocal movement relative thereto, each of said pinion gears having a body with a non-circular central hole therethrough constructed and arranged to removably receive a shaft having a complimentary non-circular cross section so that when the shaft is received in said holes all said gears will be supported by the shaft and the shaft and said gears will rotate in unison on the axis of said gears, each side of each of said pinion gears having an annular peripheral shoulder therein opening generally radially and axially outwardly of said gears, each of said gears having a surface within its central hole which bears on the shaft when received therein with said surface having an axial length greater than the axial length of the teeth of said gear disposed between said shoulders of said gear, a pair of bushings each having a cylindrical portion with a central passage through which the shaft can extend and an axially extending rim constructed and arranged to be received on one of said shoulders formed within said teeth of one of said gears, and said bushings being in generally opposed relation, journalled in the housing and carrying, supporting and mounting the shaft and all of said pinion gears for rotation on a common axis at least substantially co-incident with the axis of rotation of said bushings.

21. Actuator apparatus comprising, a housing, an elongate rack carried by said housing for reciprocal movement relative thereto, a separate pinion gear meshed with said rack, said pinion gear having a body with a non-circular central hole therethrough constructed and arranged to removably receive a shaft having a complimentary non-circular cross section so that when the shaft is received in said hole said gear will be supported by the shaft and the shaft and said gear will rotate in unison on the axis of said gear, each side of said pinion gear having an annular peripheral shoulder therein opening generally radially and axially outwardly of said gear, said gear having a surface within its central hole which bears on the shaft when received therein with said surface having an axial length greater than the axial length of the teeth of said gear disposed between the shoulders of said gear, a pair of bushings each having a cylindrical portion with a central passage through which the shaft can extend and an axially extending rim constructed and arranged to be received on one of the shoulders said gear, and said bushings being in generally opposed relation, journalled in the housing and carrying, supporting and mounting the shaft and said pinion gear for rotation on an axis at least substantially co-incident with the axis of rotation of said bushings.

22. An actuator device comprising, a housing, an elongate rack carried by said housing for reciprocal movement relative thereto, at least two spaced apart bearings carried by said housing and journalling said rack for reciprocal movement relative thereto, each of said bearings having at least one recess therein opening onto said rack journalled therein, a graphite lubricant disposed in said recess of each bearing for long-term lubrication of its associated bearing and said rack, a separate pinion gear having teeth meshed with said rack and having a body with a non-circular central hole therethrough constructed and arranged to removably receive a shaft having a complimentary non-circular cross section so that when the shaft is received in said hole said gear is supported by the shaft and the shaft and said gear will rotate in unison on the axis of the gear, each side of said pinion gear having an annular peripheral shoulder therein opening generally radially and axially outwardly of said gear and a central hub on said body between said shoulder and said central hole, each said gear having a surface within its central hole which bears on the shaft when received therein with said surface having an axial length greater than the axial length of the teeth of said gear disposed between the shoulders of said gear, a pair of bushings each having a cylindrical portion with a central passage through which the shaft can extend and a flange with an axially extending rim constructed and arranged to be received in a shoulder formed within said teeth of said gear and a counterbore receiving the hub associated with said shoulders, and said bushings being in generally opposed relation, journalled in the housing and carrying, supporting and mounting the shaft and said pinion gear for rotation on a common axis at least substantially co-incident with the axis of rotation of said bushings.

* * * * *